US008441346B2

(12) United States Patent
Imam

(10) Patent No.: US 8,441,346 B2
(45) Date of Patent: May 14, 2013

(54) VEHICLE GATE AJAR NOTIFICATION METHOD

(75) Inventor: Altaf S. Imam, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 243 days.

(21) Appl. No.: 13/085,506

(22) Filed: Apr. 13, 2011

(65) Prior Publication Data

US 2012/0262287 A1 Oct. 18, 2012

(51) Int. Cl.
*B60Q 1/00* (2006.01)

(52) U.S. Cl.
USPC ..................... 340/457; 340/12.55; 340/425.5; 340/426.25; 340/426.28; 340/447; 296/76; 296/146.8

(58) Field of Classification Search ................. 340/12.5, 340/425.5, 426.2, 426.28, 447; 296/76, 146.8
See application file for complete search history.

(56) References Cited

U.S. PATENT DOCUMENTS

| | | | | | |
|---|---|---|---|---|---|
| 4,963,856 | A | * | 10/1990 | Yukitomo | 340/426.25 |
| 5,387,897 | A | * | 2/1995 | Bechtle et al. | 340/426.28 |
| 5,684,470 | A | * | 11/1997 | DeLand et al. | 340/12.5 |
| 6,091,322 | A | * | 7/2000 | Ang et al. | 340/425.5 |
| 6,496,106 | B1 | * | 12/2002 | Rodriguez | 340/425.5 |
| 7,097,226 | B2 | * | 8/2006 | Bingle et al. | 296/76 |
| 7,226,112 | B2 | * | 6/2007 | Ward | 296/146.8 |
| 2007/0075849 | A1 | * | 4/2007 | Pitt | 340/426.2 |
| 2007/0205881 | A1 | * | 9/2007 | Breed | 340/447 |

* cited by examiner

*Primary Examiner* — Daniel Wu
*Assistant Examiner* — Israel Daramola

(57) ABSTRACT

A vehicle user is notified of a rear gate ajar condition so that the user can take corrective action by opening and then re-closing the rear gate. The method includes the steps of determining that the rear gate latch has engaged a latch striker but has not reached a fully latched position; operating a vehicle mounted signaling device that is cognizable by a user while still standing at the rear gate so that the user will receive immediate notification that the rear gate latch has not reached the fully latched position, thereby enabling the user to take immediate corrective action by opening and then re-closing the gate to attempt a fully latched position of the rear gate latch; and then, if the vehicle is started without the lift gate operator having taken corrective action to obtain full latching of the rear gate latch, energizing a lift gate ajar light on the instrument panel so that the vehicle driver is notified to take corrective action before driving away.

10 Claims, 3 Drawing Sheets

VEHICLE GATE AJAR NOTIFICATION METHOD

FIELD OF THE INVENTION

The present invention relates to the closing of the rear compartment gate on a motor vehicle and more particularly provides the vehicle user with immediate notification that the rear gate latch has not reached the fully latched position so that the user can take immediate corrective action before getting into the vehicle.

BACKGROUND OF THE INVENTION

Most motor vehicles have a rear compartment that is accessible through a rear compartment gate, such as a trunk lid, a liftgate, a tailgate, or similar rear compartment gate. The rear gate is pivotally mounted on the vehicle body for swinging movement between open and closed positions. At the closed position, the gate is latched by a latch that engages with a striker. It is common for vehicle latches, including rear gate latches, to include a rotary fork bolt that has an unlatched position when the rear gate is open, a primary latch position when the latch is fully engaged with the striker, and a secondary position in which the rotary latch is engaged with the striker but has not reached the fully latched primary latch condition.

It is not unusual for the vehicle user to close the rear gate without imposing enough force to achieve the fully latched primary latch position. Or, sometimes, a piece of luggage or cargo is obstructing the full closing movement of the rear gate. In these situations, the latch obtains only the secondary latched condition. Accordingly, many vehicles have a gate ajar light on the instrument panel so that when the driver starts the car, the gate ajar light will illuminate and the driver is notified that the rear gate has not reached the fully latched position. Upon seeing the gate ajar light illuminated, the driver will then get out of the vehicle, walk around to the rear the vehicle, and then open and re-close the rear gate with greater effort or remove any obstruction that had prevented the full closing movement of the rear gate.

It would be desirable to provide an improved notification to the vehicle user so that the vehicle user could be provided with immediate notification that the latch has not reached the fully latched position, so that the user can take immediate corrective action before getting into the vehicle.

SUMMARY OF THE INVENTION

A vehicle user is notified of a rear gate ajar condition so that the user can take corrective action by opening and then re-closing the rear gate. The method includes the steps of determining that the rear gate latch has engaged a latch striker but has not reached a fully latched position; operating a vehicle mounted signaling device that is cognizable by a user while still standing at the rear gate so that the user will receive immediate notification that the rear gate latch has not reached the fully latched position, thereby enabling the user to take immediate corrective action by opening and then re-closing the gate to attempt a fully latched position of the rear gate latch; and then, if the vehicle is started without the lift gate operator having taken corrective action to obtain full latching of the rear gate latch, energizing a lift gate ajar light on the instrument panel so that the vehicle driver is notified to take corrective action before driving away.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings.

DETAILED DESCRIPTION OF THE EXEMPLARY EMBODIMENTS

The following description of certain exemplary embodiments is merely exemplary in nature and is not intended to limit the invention, its application, or uses.

Figure 2:
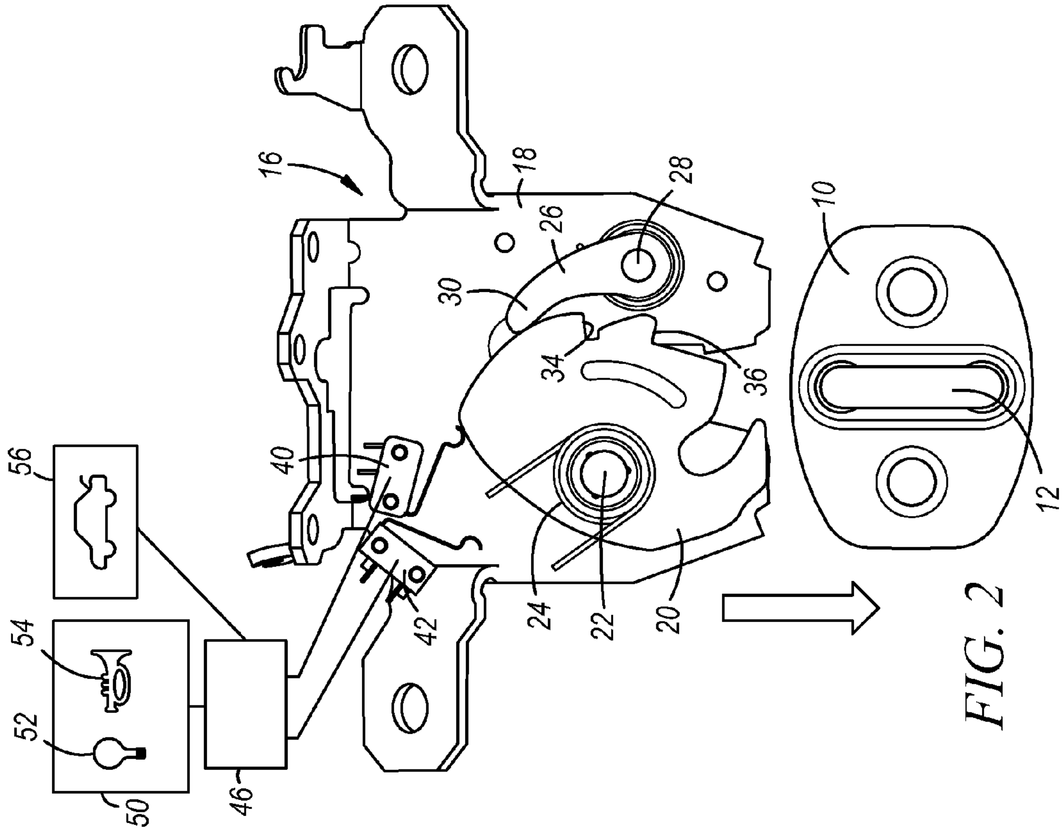
FIG. 2 is a view of a vehicle gate latch shown in the unlatched position.

Referring to FIG. 2, a striker 10 is mounted on a vehicle body and includes a striker pin 12. A latch, generally indicated at 16, includes a housing 18 mounted on a rear gate of the vehicle. The rear gate can be a trunk lid in a sedan type vehicle, a lift gate or hatch in a sport utility type vehicle, or a tailgate in a pickup truck vehicle. A fork bolt 20 is mounted on housing 18 by a pivot 22 so that the fork bolt 20 can rotate between an unlatched position shown in FIG. 2, a partial or secondary latched position shown in FIG. 3, and a fully latched or primary latched position shown in FIG. 4. The fork bolt is biased clockwise as viewed in FIG. 2 by a fork bolt spring 24. A locking lever 26 is mounted on the housing 18 by pivot 28. The locking lever 26 has a tooth 30 that engages with fork bolt 20.

In FIG. 2, the rear gate is open and the latch 16 is spaced away from the striker 10. The tooth 30 of locking lever 26 is resting on the fork bolt 20 and the fork bolt 20 is in its unlatched position.

Figure 3:
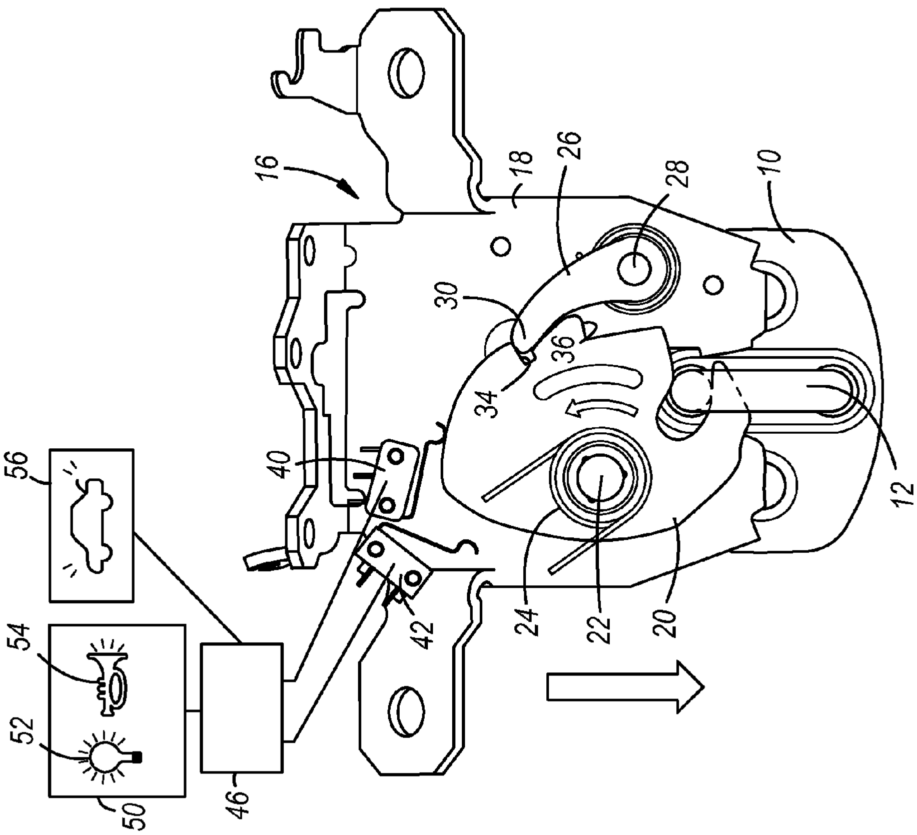
FIG. 3 is a view similar to FIG. 1 but showing the latch in the secondary or partially latched position.

In FIG. 3, the rear gate has been moved in the closing direction and the fork bolt 20 has rotated about its pivot 22 and becomes engaged with the striker pin 12 of striker 10. This rotary movement of the fork bolt 20 has allowed the tooth 30 of locking lever 26 to become engaged with a secondary latching surface 34 of the for bolt 20. Thus, in FIG. 3, although the rear gate has not reached its fully closed position, the rear gate cannot be reopened until the locking lever 26 is pivoted away from the fork bolt 20. The latch 16 includes an unlatching mechanism, not shown, which can be operated by a key, a handle, or a solenoid to pivot the locking lever 26 and thereby release the fork bolt 20 so that the fork bolt spring 24 is free to pivot the fork bolt 20 in the clockwise direction to disengage the fork bolt 20 from the striker pin 12 so that the rear gate can be reopened.

Figure 4:
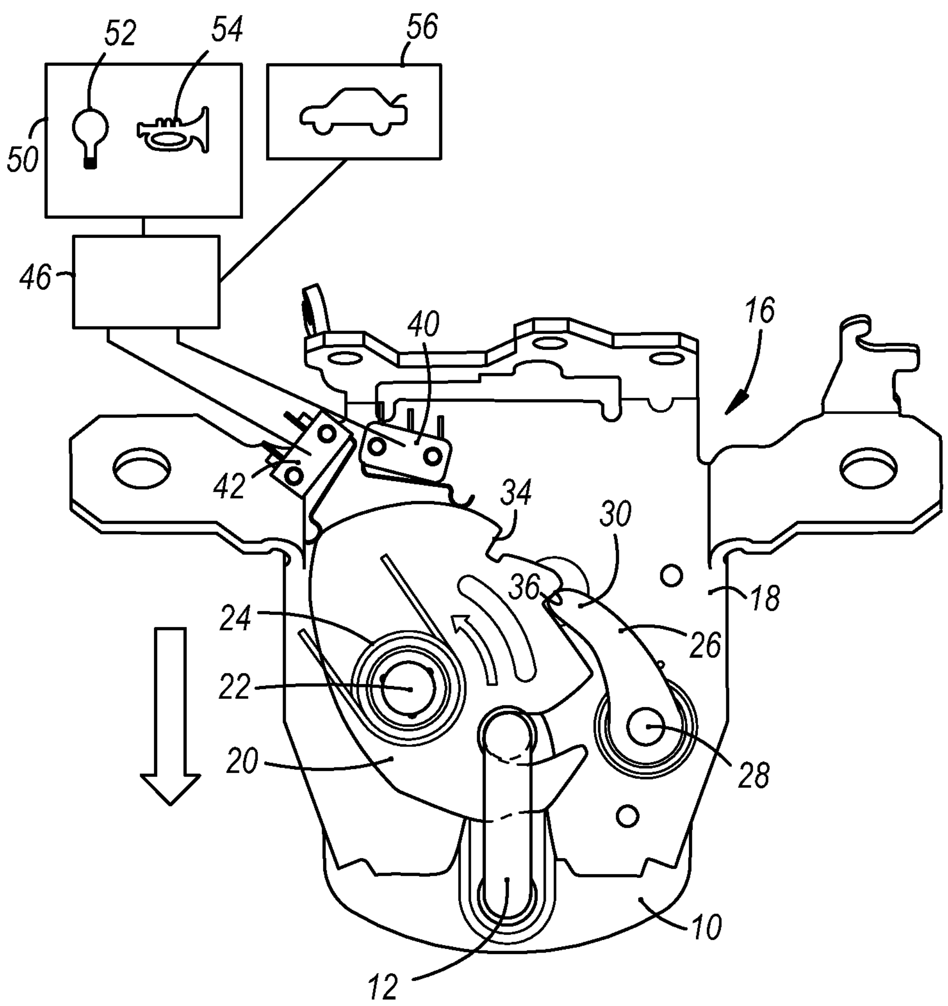
FIG. 4 is a view similar to FIGS. 2 and 3 but showing the gate latch in the primary fully latched position.

In FIG. 4, the rear gate has successfully moved to the fully closed position and the striker pin 12 has induced a further rotation of the fork bolt 20 against the bias of the fork bolt spring 24 so that the fork bolt 20 has reached its fully latched position. In the fully latched position of FIG. 4, the locking lever 26 has rotated into engagement with a primary latching surface 36 of the fork bolt 20. Thus, the rear gate is latched in its fully closed position and the latch 16 will remain latched until unlatched by the vehicle user.

As seen in FIGS. 2, 3, and 4 the latch 16 is provided with a microswitch 40 and a microswitch 42 that are positioned to be operated by the fork bolt 20. For example, in FIG. 2, the latch 16 is in the unlatched position, and the microswitch 40 is open and microswitch 42 is open. In FIG. 3, the fork bolt 20 is in the secondary latched position, and microswitch 40 is closed and microswitch 42 is open. In FIG. 4 the fork bolt 20 is in the fully latched position and the microswitch 40 is closed and the microswitch 42 is closed.

As seen in FIGS. 2, 3, and 4, the microswitch 40 and the microswitch 42 are connected to a control module 46. The control module 46 receives inputs from the microswitches 40 and 42 as well as inputs from other vehicle systems, such as the vehicle ignition. The control module 46 processes these various inputs and sends outputs to various vehicle systems. As seen in FIG. 2, the control module 46 is connected to a signal device 50. The signal device 50 will emit an audible or visible signal to the vehicle user who is closing the rear gate. For example, the signal device 50 can be the tail lights or turn signal lights 52 of the vehicle which are visible to the user standing at the rear gate. Or, the signal device 50 can be the vehicle horn 54. In addition, as seen in FIG. 2, the control module 46 is connected to a gate ajar light or symbol 56 that is provided on the instrument panel of the vehicle.

Figure 1:
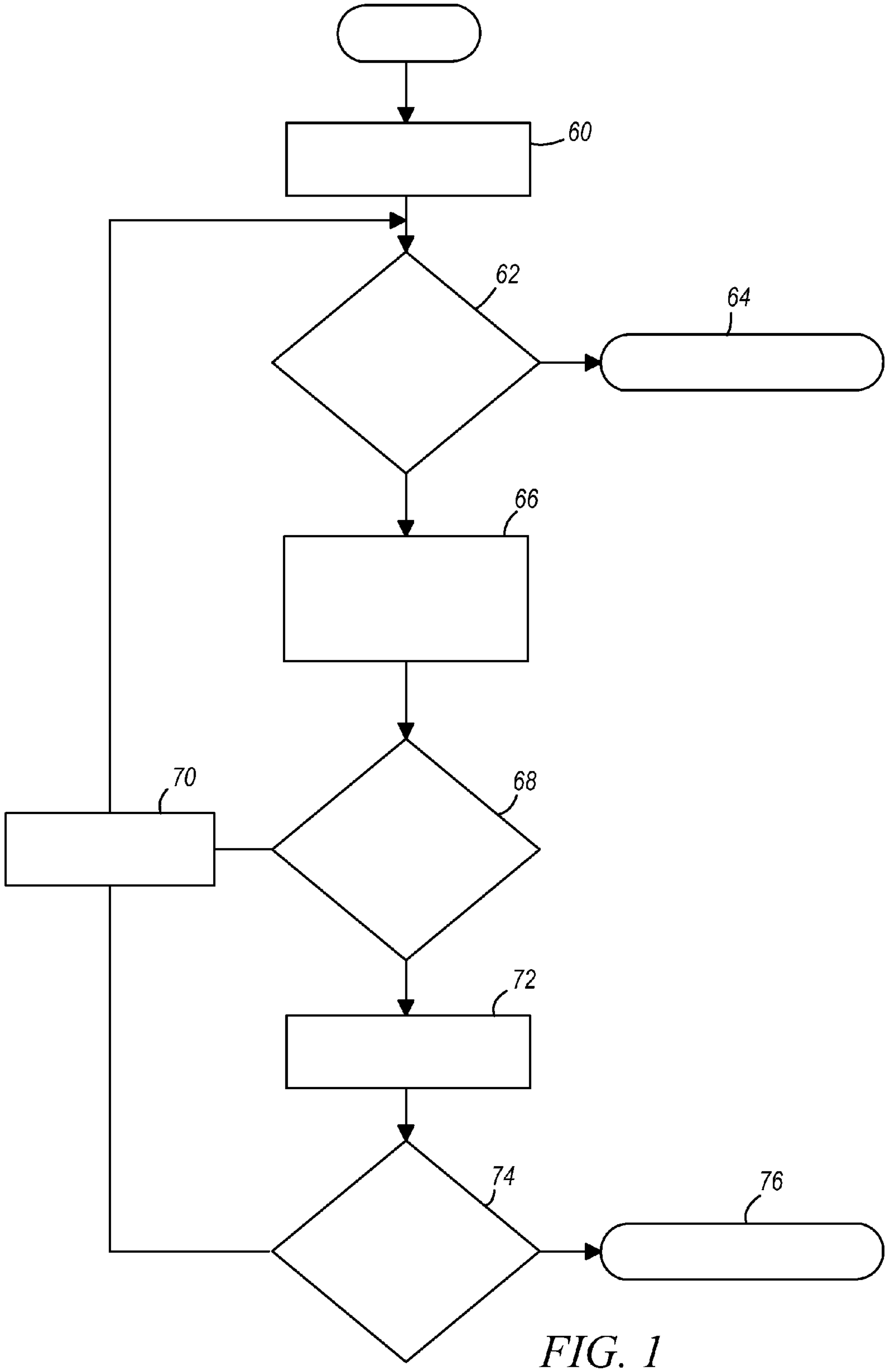
FIG. 1 is a flowchart showing the steps of the notification method of this invention.

FIG. 1 of the drawings is a flowchart describing how the control module 46 of FIG. 2 will be programmed in order to practice our method for providing immediate notification to the vehicle user if the closing of the rear gate does not obtain a full latching of the rear gate latch.

In step 60 of the FIG. 1, the vehicle user will close the rear gate, causing the fork bolt 20 of the latch 16 to strike the striker pin. Depending on how much effort the user employs, and depending on whether any cargo or luggage is obstructing the rear gate, the fork bolt 20 will reach either its partially latched position of FIG. 3 or the fully latched position of FIG. 4.

In step 62 of FIG. 1, the control module 46 receives the inputs from microswitches 40 and 42 and determines whether the latch 16 has reached the fully latched position of FIG. 3. If the latch 16 has reached the fully latched position of FIG. 3, step 64 of FIG. 1, shows that the vehicle user can enter the vehicle and drive away.

In step 66 of FIG. 1, the control module 46 has determined that the latch 16 has not reached the fully latched position. Instead, latch 16 has remained in the secondary or partially latched position of FIG. 3. For example, the control module 46 may observe that the fork bolt 20 has not reached the fully latched position of FIG. 4 within 500 milliseconds of having left the unlatched position of FIG. 2. Thus, having determined that the latch 16 has not reached the fully latched position, and, accordingly, the rear gate has not reached its fully closed position, the control module 46 will immediately activate the exterior signaling device 50. For example, the tail light or turn signal lights 52 can be flashed, and/or the horn 54 can be sounded. The vehicle user, having just attempted to close the rear gate, will still be standing at the rear gate and will see or hear the exterior signaling device 50, and will thereby be notified that he should open the rear gate and try to close the rear gate again.

At step 68 of FIG. 1, the vehicle user either takes the corrective action by opening the rear gate and then re-closing the rear gate, or the vehicle user fails to take the corrective action.

At step 70 of FIG. 1, the vehicle user has taken the corrective action and, accordingly, the control module 46 will receive new inputs from the microswitch 40 and microswitch 42, and make a renewed determination at step 62 as to whether or not the latch 16 has now reached the fully latched position of FIG. 4. In this way the vehicle user, while standing at the rear of the vehicle, will receive repeated notifications until the full latching position is obtained and step 64 is reached. In step 64, the vehicle user enters the vehicle and drives away with a fully latched rear gate.

At step 72 of FIG. 1, we see that the driver did not take corrective action at step 68, and instead has ignored the notification emanating from the exterior signal device 50. Thus, at step 72, the driver has started the engine and the gate ajar symbol of 56 of FIG. 2 will be illuminated in order to advise the driver that the rear gate is ajar.

Then, at step 74 of FIG. 1, the driver has an opportunity once again to take corrective action by getting out of the vehicle, opening the rear gate, and then re-closing the rear gate. If the driver takes corrective action at step 74, the control module 46 will once again receive new inputs from the microswitches 40 and 42, and step 62 will be repeated to determine whether the latch has reached its fully latched position.

If the corrective action is not taken at step 74, then, at step 76 of FIG. 1, the vehicle user is able to drive away with the gate ajar light on. Although it is preferable that the rear gate be fully latched, the rear gate is retained in the partial latched position by the latch 16 remaining in the partially latched secondary latched position of FIG. 3.

Thus, it is seen that the invention assists the vehicle user by providing immediate notification to the vehicle user if the closing of the rear gate does not accomplish a full latching of the latch. With the immediate notification provided by the flashing of the lights or the sounding of the horn, the vehicle user has an opportunity to open and then re-close the rear gate while he is still standing closely adjacent the rear gate of the vehicle. It is more convenient for the vehicle user to receive the notification immediately rather than having to wait until entering the vehicle and starting the car in order to determine whether the rear gate has reached its fully latched position. In some cases the vehicle user may be unaware of the reason that his horn has sounded or his lights have flashed. In such case, the user enters the car and then receives a secondary notification via the tailgate ajar symbol on the instrument panel.

It will be understood that the foregoing description provides one example of how to carry out the rear gate ajar notification method, and that modifications to the method can be readily made. For example, although the drawings show the example of two microswitches in the latch for sending inputs to the control module 46, the invention can be practiced with any number of switches or sensors for providing the inputs to the control module 46. In addition, the exterior signal device 50 can be operated in a flashing or honking mode, or any pattern or duration of signaling can be employed. For example, the exterior signal device 50 could be a loudspeaker that would provide an announcement such as "rear gate is ajar".

What is claimed is:

1. A method for alerting a vehicle user of a rear gate ajar condition, comprising:

determining that the rear gate latch has engaged a latch striker but has not reached a fully latched position;

operating a vehicle mounted signaling device that is cognizable by the user standing at the rear gate so that the user will receive immediate notification that the rear gate latch has not reached the fully latched position, thereby enabling the user to take immediate corrective action by opening and then re-closing the gate to attempt a fully latched position of the rear gate latch;

and then, if the vehicle is started without the user having taken corrective action to obtain full latching of the rear gate latch, energizing a rear gate ajar light on the instrument panel so that the vehicle driver is notified to take corrective action before driving away.

2. The method of claim 1 further comprising the operating of the vehicle mounted signaling device being an energization of at least the vehicle horn.

3. The method of claim 1 further comprising the operating of the vehicle mounted signaling device being an energization of at least the vehicle rear lights.

4. The method of claim 1 further comprising the operating of the vehicle mounted signaling device being an energization of both the vehicle horn and the rear lights.

5. The method of claim 1 further comprising determining that the rear gate latch has engaged a latch striker but has not reached a fully latched position via monitoring of switches or sensors associated with the rear gate latch.

6. The method of claim 5 further comprising monitoring the switches to determine that a fork bolt of the latch has moved from an unlatched position to a secondary latched position and has not reached a primary fully latched condition within a predetermined time of having reached the secondary latched position.

7. A method for alerting a vehicle user of a rear gate ajar condition, comprising:

determining whether a rear gate latch for latching the rear gate has reached a fully latched position or remained in a secondary partially latched position;

if the rear gate latch has remained in the secondary partially latched position, then energizing a vehicle horn or energizing a rear light on the vehicle to give immediate notification to the user standing at the rear gate that the rear gate latch has remained in the secondary latched position, thereby enabling the user to take immediate corrective action by opening and then re-closing the rear gate to attempt to achieve fully latched position of the rear gate latch;

and, if the vehicle is started without the user having taken corrective action to achieve full latching of the rear gate latch, energizing a rear gate ajar light on the instrument panel so that the vehicle driver is notified to take corrective action before driving away.

8. The method of claim 7 further comprising determining that the rear gate has remained in the secondary partially latched position and has not reached a fully latched position via monitoring of switches or sensors associated with the rear gate latch.

9. The method of claim 8 further comprising monitoring the switches to determine that a fork bolt of the latch has moved from an unlatched position to a secondary latched position and has not reached a primary fully latched condition within a predetermined time of having reached the secondary latched position.

10. A method for alerting a vehicle user of a rear gate ajar condition, comprising:

providing a rear gate latch having a fork bolt for engaging with a striker pin, said rear gate latch having switches or sensors associated therewith to sense the position of a fork bolt;

providing a controller for monitoring the switches or sensors to determine that the fork bolt has moved from an unlatched position to a secondary partially latched positions but not reached a fully latched position within a predetermined time;

and if the rear gate latch has not reached the fully latched position within the predetermined time, then energizing a vehicle horn or energizing a rear light on the vehicle to give immediate notification to the user while the rear gate operator is still standing at the rear gate, thereby enabling the user to take immediate corrective action by opening and then re-closing the gate to attempt to achieve fully latched position of the rear gate latch;

and if the vehicle is started without the user having taken corrective action to achieve full latching of the rear gate latch, energizing a rear gate ajar light on the instrument panel so that the vehicle driver is notified to take corrective action before driving away.

* * * * *